United States Patent
Koyabu et al.

(10) Patent No.: US 7,379,655 B1
(45) Date of Patent: May 27, 2008

(54) INFORMATION SEARCHING DEVICE, INFORMATION RECEIVER, AND METHODS THEREFOR

(75) Inventors: Aki Koyabu, Tokyo (JP); Mitsuru Nagasaka, Tokyo (JP); Tomoko Oyabu, Tokyo (JP); Tomoko Terakado, Tokyo (JP)

(73) Assignee: Sony Corporation, Tokyo (JP)

( * ) Notice: Subject to any disclaimer, the term of this patent is extended or adjusted under 35 U.S.C. 154(b) by 1018 days.

(21) Appl. No.: 09/890,260

(22) PCT Filed: Dec. 4, 2000

(86) PCT No.: PCT/JP00/08577

§ 371 (c)(1),
(2), (4) Date: Aug. 7, 2001

(87) PCT Pub. No.: WO01/43429

PCT Pub. Date: Jun. 14, 2001

(30) Foreign Application Priority Data

Dec. 7, 1999 (JP) .................................. 11/348119

(51) Int. Cl.
*H04N 5/93* (2006.01)
(52) U.S. Cl. .................... 386/52; 386/46; 386/83; 386/90; 725/10; 725/21; 725/46; 725/87; 725/88
(58) Field of Classification Search ................ 386/83, 386/46, 52; 725/10, 21, 46, 87, 88
See application file for complete search history.

(56) References Cited

U.S. PATENT DOCUMENTS

| | | | | |
|---|---|---|---|---|
| 5,790,176 A * | 8/1998 | Craig | ........................ | 725/115 |
| 5,977,964 A * | 11/1999 | Williams et al. | ............ | 715/721 |
| 6,430,358 B1* | 8/2002 | Yuen et al. | .................... | 386/83 |
| 7,242,988 B1* | 7/2007 | Hoffberg et al. | .............. | 700/28 |
| 2004/0003393 A1* | 1/2004 | Gutta et al. | .................... | 725/25 |
| 2005/0131727 A1* | 6/2005 | Sezan et al. | .................... | 705/1 |
| 2007/0061735 A1* | 3/2007 | Hoffberg et al. | ............ | 715/744 |
| 2007/0079333 A1* | 4/2007 | Murakami et al. | ............ | 725/46 |

FOREIGN PATENT DOCUMENTS

| | | | |
|---|---|---|---|
| EP | 0892554 A2 * | 1/1999 |
| JP | 10-32797 | 2/1998 |
| JP | 10-257405 | 9/1998 |
| JP | 11-75128 | 3/1999 |
| JP | 11-164217 | 6/1999 |

* cited by examiner

*Primary Examiner*—Thai Q. Tran
*Assistant Examiner*—Helen Shibru
(74) *Attorney, Agent, or Firm*—Oblon, Spivak, McClelland, Maier & Neustadt, P.C.

(57) ABSTRACT

By storing usage history information of a recording medium for recording information, which is obtained by using the recording medium, in storing means 13, and retrieving information that matches a user's preference from a plurality of information based on the usage history information, a program that matches the user's preference can be easily retrieved without inputting key information for retrieving information, hence time and effort in retrieving information can be further reduced.

14 Claims, 11 Drawing Sheets

| | |
|---|---|
| PROGRAM ID | PROGRAM ID DATA (CODE) |
| CHANNEL OF BROADCASTING STATION | CHANNEL DATA (CODE) |
| NAME OF BROADCASTING STATION | TEXT DATA |
| STARTING TIME | TIME DATA |
| DURATION (OR ENDING TIME) | TIME DATA |
| PROGRAM TITLE | TEXT DATA |
| PROGRAM SUBTITLE | TEXT DATA |
| PROGRAM DESCRIPTION | TEXT DATA |
| GENRE | GENRE DATA (CODE) |

TODAY'S RECOMMEMDATION

20-Jan.Fri. 7:34PM

◁ 9:00-11:00 PM ▷  △

| 9:15- | ABC | Three Guys and a Girl | Drama |
|---|---|---|---|
| 9:30- | CBS | Welcome to Chicago | Show |
| 9:30- | NBC | Online NBC | News |
| 10:00- | FOX | Figure Skating | Sports |
| 10:45- | UPN | Boyfriends | Drama |

▽

Boyfriends : 7:00-7:45

Fried Turkey: When her friends can't make it to her Thanksgiving dinner, Jodie invites a high-profile attorney instead. Executive producer Sandy Grammer guest stars.   ▽

FIG. 9

<RECOMMENDED PROGRAM>

DRAMA

Over Today 2/15 21:00-21:54 8ch
EMERGENCY HOSPITAL 2/16 21:00-21:54 8ch

MUSIC

Music book 2/19 20:00-21:00 10ch
Music out 2/20 23:00-23:30 8ch

INFORMATION SEARCHING DEVICE, INFORMATION RECEIVER, AND METHODS THEREFOR

TECHNICAL FIELD

The present invention relates to an information retrieving apparatus and an information receiving apparatus, and methods of retrieving and receiving information, and for example, is preferably applied to a receiver which receives broadcasting waves sent from a broadcasting station and displays images based on the broadcasting waves on a monitor.

BACKGROUND ART

Conventionally, a broadcasting station which offers a broadcasting service by the analog ground wave broadcasting has already allocated frequency band for use, to transmit its own program data using the allocated frequency band. A receiver installed in a viewer's house (hereinafter referred to as an IRD (an Integrated Receiver Decoder)) selects program data of a desired broadcasting station, from program data to be sent from broadcasting stations, and displays the program data of the selected broadcasting station on an external monitor by decoding the data, in accordance with a station selecting operation by the viewer.

Incidentally, in an analogue ground wave broadcasting system, it has been proposed to periodically distribute data indicating contents of programs that is called an electronic program guide information (hereinafter referred to as an EPG (an Electronic Program Guide)), from a specific broadcasting station, for informing a viewer of programs to be provided by each broadcasting station. The EPG data includes information such as a program title, a broadcasting date and time, a broadcasting channel, and description of a program, and will be used to determine which program a viewer watches.

In this case, the IRD receives and stores in a memory the EPG data, which is periodically sent from a broadcasting station that transmits the EPG data, and reads out the EPG data from the memory and displays it on an external monitor in accordance with a displaying operation by the viewer. In this way, the viewer can decide a program that the viewer watches, by viewing the EPG data displayed on the monitor.

Incidentally, although the EPG data includes information on an enormous number of programs, a display screen of the monitor limits the display of the EPG data. It is the reason why the IRD can only display information on a part of programs out of the enormous numbers of programs, on the display screen of the monitor. Therefore, a viewer needs to perform a scrolling operation to retrieve a desired program out of the enormous number of programs, which makes the viewer do bothering work.

Here, in order to resolve such a bothering retrieving operation, there has been considered a method in which a keyword is inputted for retrieving a desired program from the enormous number of programs included in the EPG data, retrieval of the program is executed based on the inputted keyword, and a result of retrieval is displayed on the display screen of the monitor.

However, with this method, since a user has to perform an operation such as to input a keyword with a keyboard or the like, the method is not enough to reduce operation for retrieval. In addition, since the retrieval of the program is executed based on only the keyword, a program that does not match the user's preference might be retrieved.

DESCRIPTION OF THE INVENTION

The present invention has been achieved in view of the above problems, and is intended to propose an information retrieving apparatus and an information receiving apparatus, and methods for retrieving and receiving information that are capable of reducing operation for retrieving information.

In order to solve such problems, the present invention can easily retrieve a program that matches a user's preference, without inputting key information for retrieving information, by storing in storing means usage history information of a recording medium for recording information that is obtained through usage of the recording medium, and retrieving information that matches the user's preference, from a plurality of pieces of information on the basis of the usage history information.

BEST MODE FOR CARRYING OUT THE INVENTION

Embodiments of the present invention will be hereinafter described in detail with reference to drawings.

(1) CONFIGURATION OF AN ANALOG GROUND WAVE BROADCASTING SYSTEM

Figure 1:
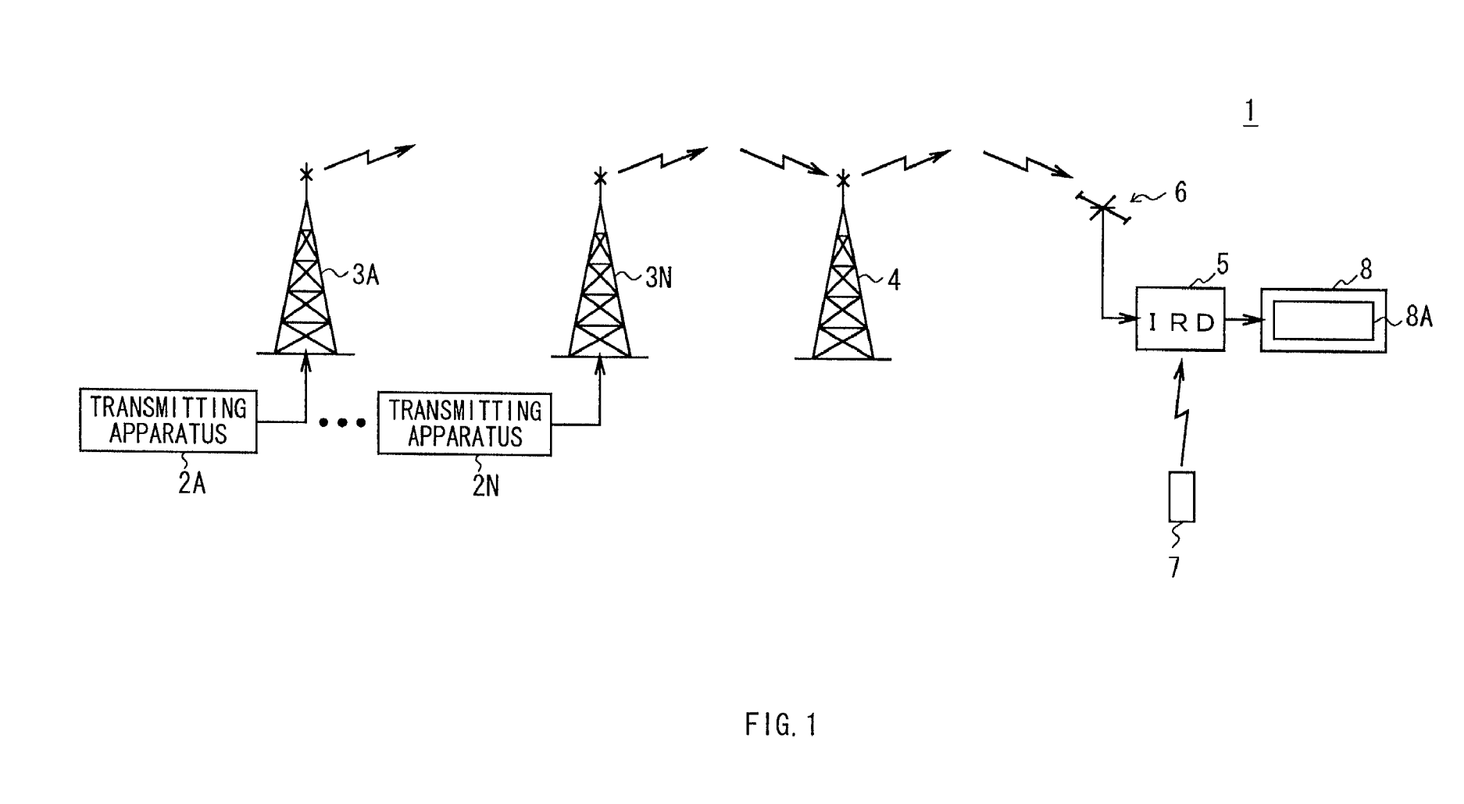
FIG. 1 is a block diagram showing an analog ground wave broadcasting system in accordance with the present invention.

In FIG. 1, reference numeral 1 denotes a configuration of an analog ground wave broadcasting system as a whole, transmitting apparatuses 2A through 2N as information providing means installed in respective broadcasting station transmit image signals and audio signals of programs via transmission antennas 3A through 3N respectively. A relay apparatus 4 relays broadcasting waves transmitted from the transmitting apparatuses 2A through 2N, to distribute them to a receiver installed in each viewer's house (hereinafter referred to as an IRD (an Integrated Receiver Decoder)) 5.

The IRD 5 as an information receiving apparatus receives broadcasting waves distributed from a plurality of broadcasting stations, by a receiving antenna 6, selects program data of a designated broadcasting station from program data of the received plurality of broadcasting stations, in accordance with a station selecting operation carried out by a viewer (a user) with a remote commander 7 as inputting means, and outputs for displaying the program data of the selected broadcasting station on a monitor 8 as display means after demodulating it.

(2) CONFIGURATION OF THE IRD

Figure 2:
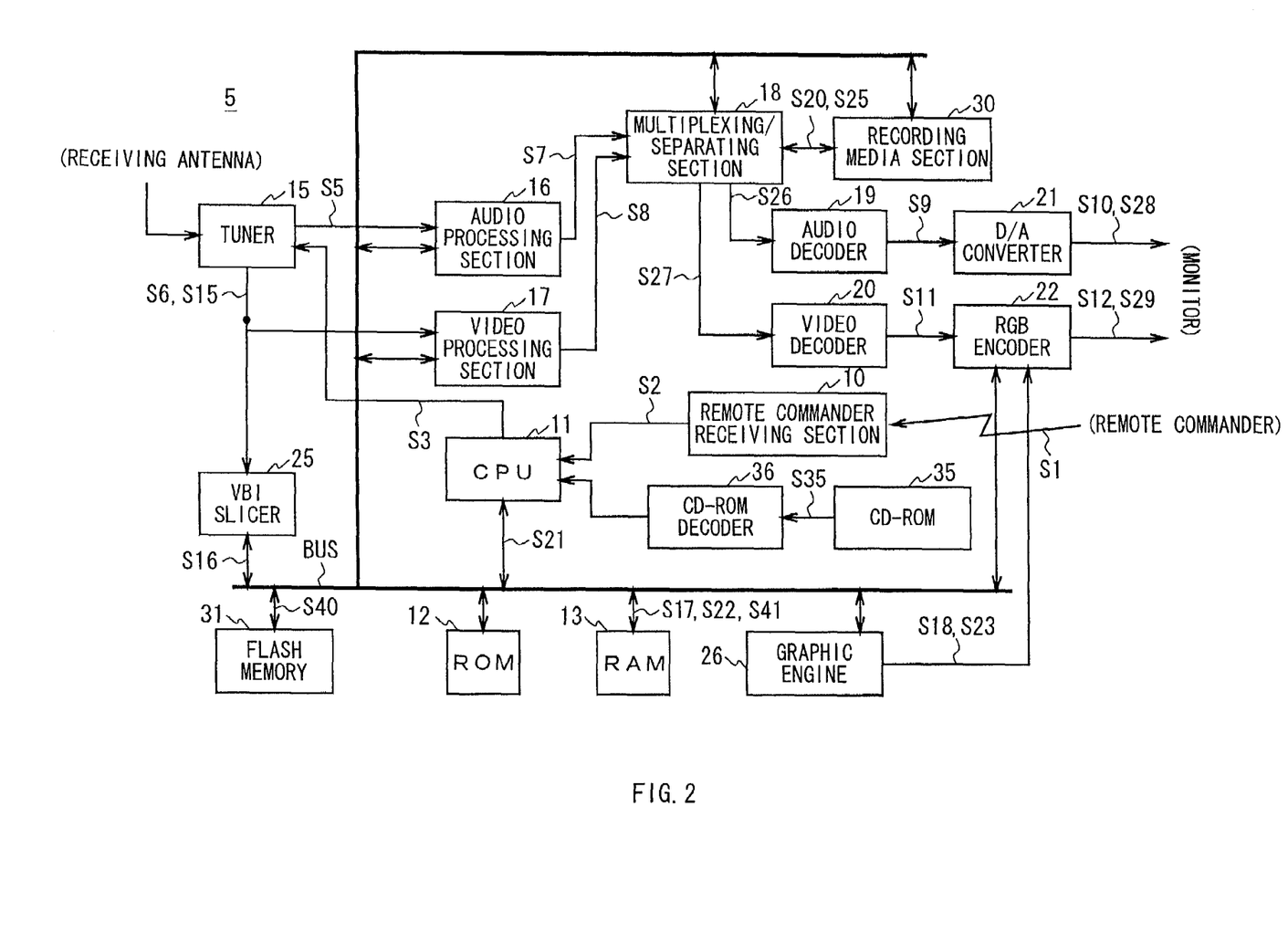
FIG. 2 is a block diagram showing an embodiment of an information retrieving apparatus in accordance with the present invention.

As shown in FIG. 2, the IRD 5 receives at a remote commander receiving section 10 a command signal S1 to be transmitted with being superimposed on an infrared ray from the remote commander 7 (FIG. 1), and, after generating a command signal S2 obtained by converting the command signal S1 to an electric signal, forwards it to a CPU (a Central Processing Unit) 11.

The CPU 11 takes out a control program stored in an ROM (a Read Only Memory)) 12 as required, and transfers the taken program to an RAM (a Random Access Memory) 13 as storing means to open it. Then, the CPU 11 is made to control each circuit of the IRD 5 by reading out and executing the control program opened in the RAM 13.

The CPU 11 analyzes the command signal S2 forwarded from the remote commander receiving section 10, and as a result, when determining that the viewer has performed a station selecting operation with the remote commander 7 (FIG. 1), generates a channel selection signal S3 corresponding to the station selecting operation and forwards it to the tuner 15.

The tuner 15 extracts broadcasting waves of a channel (a broadcasting station) corresponding to the channel selecting signal S3 from the broadcasting waves received by the receiving antenna 6 (FIG. 1), generates an audio signal S5 and a image signal S6 by demodulating the extracted broadcasting waves of the channel, and forwards the audio signal S5 to an audio processing section 16 and, on the other hand, forwards the image signal S6 to a video processing section 17.

After analog-digital converting the audio signal S5, the audio processing section 16 compresses and encodes the signal by the encoding method based on the MPEG (Moving Picture Experts Group) standard, and forwards the resultant encoded audio data S7 to an audio decoder 19 via a multiplexing/separating section 18. After analog-digital converting the image signal S6, the video processing section 17 compresses and encodes the signal by the encoding method based on the MPEG standard, and forwards the resultant encoded video data S8 to a video decoder 20 via the multiplexing/separating section 18.

The audio decoder 19 expands and decodes the encoded audio data S7, and forwards the resultant audio data S9 to a digital-to-analog (D/A) converter 21. The D/A converter 21 restores an audio signal S10, which is an audio signal before being inputted to the audio processing section 16, by digital-to-analog converting the audio data S9, and output the audio signal S10 to the monitor 8 (FIG. 1).

The video decoder 20 expands and decodes the encoded video data S8, and forwards the resultant video data S11 to an RGB encoder 22. The RGB encoder 22 generates a image signal S12 by converting the video data S11 to a luminance signal and a color difference signal under the NTSC (National Television System Committee) method and, at the same time, digital-to-analog converting the data.

In this way, images of a program selected by the viewer are displayed on a display screen 8A of the monitor 8 (FIG. 1), and voices of the program selected by the viewer are outputted from a speaker of the monitor 8.

Incidentally, in the analog ground wave broadcasting system 1, description data of programs that is called electronic program guide information (hereinafter referred to as an EPG (an Electronic Program Guide) data) is made to be periodically distributed from a specific broadcasting station for informing viewers of programs to be provided from broadcasting stations.

Figure 3:
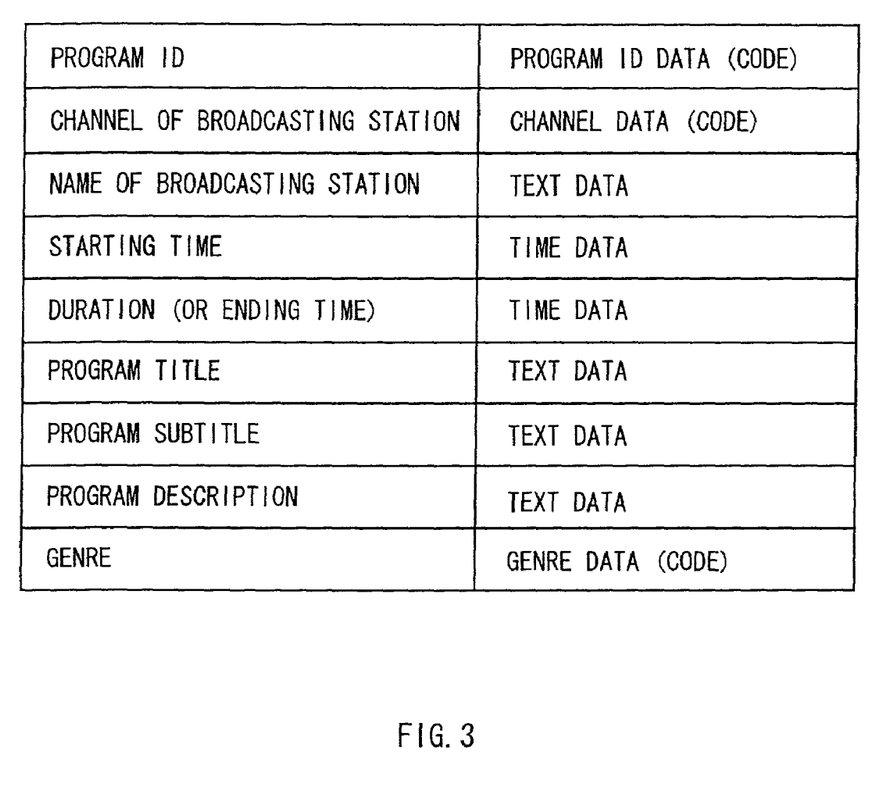
FIG. 3 is a schematic illustration showing contents of EPG data.

The EPG data is generated for each program and, as shown in FIG. 3, and includes information such as a program ID (Identification) peculiar to a program, a channel of a broadcasting station being a transmitter, a name of a broadcasting station being a transmitter, a starting time of a program, a duration of a program (or an ending time), a program title, a program subtitle supplementing the program title, a program description and program genre. The EPG data is used by a viewer to determine which program he views. In this connection, the program ID, the channel of a broadcasting station and the genre are indicated by code data, the name of a broadcasting station, the program title, the program subtitle and the program description are indicated by text data, and the starting time and the duration are indicated by time data.

The transmitting apparatus 2 installed in a specific broadcasting station superimposes, for example, the EPG data for one week on a Vertical Blanking Interval (VBI) of a image signal, and transmits the data periodically everyday at midnight, early in the morning or the like.

In this case, the tuner 15 of the IRD 5 extracts broadcasting waves of a channel on which the EPG data is superimposed, from the broadcasting waves received by the receiving antenna 6 (FIG. 1), and generates an image signal S15 by demodulating the extracted broadcasting waves of the channel to forward it to a VBI slicer 25.

The VBI slicer 25 extracts EPG data S16 from the image signal S15, and transfers the data to the RAM 13 through a bus BUS to store the EPG data S16. In this way, the IRD 5 is made to renew the EPG data S16 stored in the RAM 13 everyday and always accumulate the latest EPG data S16 in the RAM 13.

In this state, when the viewer performs an operation for displaying an EPG screen with the remote commander 7 (FIG. 1), the remote commander 7 transmits the command signal S1 for displaying the EPG screen, to a remote commander receiving section 10. The remote commander 10 converts the command signal S1 to the command signal S2 comprising an electronic signal, and forwards it to the CPU 11.

When detecting that the command signal S2 has been supplied, the CPU 11 generates EPG screen data S17 by subjecting graphic processing to the EPG data S16 in the RAM 13 based on dictionary data such as characters, symbols and the like stored in the ROM 12, and forwards the EPG screen data S17 to a graphic engine 26 through the bus BUS.

The graphic engine 26 generates an EPG image signal S18 by converting the EPG screen data S17 into a luminance signal and a color difference signal under the NTSC method and, at the same time, digital-to-analog converting it, and forwards the EPG image signal S18 to the RGB encoder 22. The RGB encoder 22 mixes the image signal S12 and the EPG image signal S18 to output them to the monitor 8 (FIG. 1), and displays an EPG screen corresponding to the EPG image signal S18 on the display screen 8A of the monitor 8.

Incidentally, when the viewer performs an operation for recording images and voices of a program with the remote commander 7 (FIG. 1), the remote commander 7 transmits the command signal S1 for performing a recording operation to the remote commander receiving section 10. The remote commander receiving section 10 converts the command signal S1 into the command signal S2 comprising an electric signal to forward it to the CPU 11.

The CPU 11 is made, when detecting that the command signal S2 has been supplied, to record the images and voices of the program designated with the remote commander 7 (FIG. 1), by controlling an operation of each circuit through the bus BUS. At this instance, the multiplexing/separating section 18 generates multiplexed data S20 by multiplexing the coded audio data S7 acquired sequentially via the tuner 15 and the audio processing section 16 and coded video data S8 acquired sequentially via the tuner 15 and the video processing section 17, and transfers the multiplexed data S20 to a recording media section 30 to record it in a built-in recording medium (not shown) as a recording medium.

In this case, when determining that the recording of the program designated by the viewer is finished, the CPU 11 generates record title list data S21 comprising a list of program titles recorded in the recording media section 30, based on the EPG data S16 stored in the RAM 13 in advance, and stores it in a flash memory 31. The CPU 11 is made to always accumulate the latest record title list data S21 in the flash memory 31 by renewing the record title list data S21 each time a program is newly recorded in the recording media section 30.

In this state, when the viewer performs an operation for displaying the record title list screen with the remote commander 7 (FIG. 1), the remote commander 7 transmits the command signal S1 for displaying the record title list screen to the remote commander receiving section 10. The remote commander receiving section 10 converts the command signal S1 into the command signal S2 comprising an electric signal to forward it to the CPU 11.

When detecting that the command signal S2 has been supplied, the CPU 11 transfers the record title list data S21 to the RAM 13, generates record title list screen data S22 by subjecting graphic processing to the record title list data S21 in the RAM 13 based on dictionary data such as characters and symbols stored in the ROM 12, and forward it to the graphic engine 26 through the bus BUS.

The graphic engine 26 generates a record title list image signal S23 by converting the record title list screen data S22 into a luminance signal and a color difference signal under the NTSC method and, at the same time, digital-to-analog converting the data, and forward it to the RGB encoder 22. The RGB encoder 22 mixes the image signal S12 and the record title list image signal S23 to output them to the monitor 8 (FIG. 1), and displays a record title list screen corresponding to the record title list image signal S23 on the display screen 8A of the monitor 8.

Here, when the viewer performs an operation for reproducing images and voices of a desired program with the remote commander 7 (FIG. 1) while viewing the record title list screen displayed on the display screen 8A of the monitor 8, the remote commander 7 transmits the command signal S1 for performing a reproducing operation to the remote commander receiving section 10. The remote commander receiving section 10 converts the command signal S1 into the command signal S2 comprising an electric signal to forward it to the CPU 11.

The CPU 11 is made, when detecting that the command signal S2 has been supplied, to reproduce the images and voices of the program designated with the remote commander 7 (FIG. 1) by controlling an operation of each circuit through the bus BUS. That is, the recording media section 30 reads out the multiplexed data S25 of the designated program from multiplexed data of a plurality of programs recorded in the built-in recording medium (not shown), and forwards it to the multiplexing/separating section 18.

The multiplexing/separating section 18 separates the multiplexed data S25 into the coded audio data S26 and the coded video data S27, generates an audio signal S28 from the coded audio data S26 sequentially via the voice decoder 19 and the D/A converter 21 to output it to the monitor 8 (FIG. 1) and, at the same time, generates an image signal S29 from the coded video data S27 sequentially via the video decoder 20 and the RGB encoder 22 to forward it to the monitor 8.

Note that, program logos of popular programs and face picture icons comprising face pictures of representative performers of the popular programs are stored in a CD-ROM (Compact Disc-Read Only Memory) 35 and, when the CD-ROM 35 is set in a CD-ROM decoder 36, the CD-ROM decoder 36 reads out data of these program logos and face picture icons from the CD-ROM 35 as popular program association data S35 that is associated with the program, and transfers it to the flash memory 31 via the CPU 11 to store it.

(3) RECORD REPRODUCTION HISTORY GENERATING PROCESSING PROCEDURE

Incidentally, in the case of this embodiment, the CPU 11 of the IRD 5 is made to store a history concerning recording, reproduction and viewing of a program designated by the viewer (that is, a usage history of a recording medium) as record/reproduction/viewing history data in the RAM 13, and always store the latest record/reproduction/viewing history data in the RAM 13 by renewing the record/reproduction/viewing history data every time a program is recorded and reproduced.

Here, the record/reproduction/viewing history data includes program history data indicating recording, reproduction and viewing histories of programs for each program name, category history data indicating recording, reproducing and viewing histories of programs for each category name that classifies programs, channel history data indicating recording, reproduction and viewing histories of programs for each channel (broadcasting station), recording time history data indicating recording histories of programs in each time, and viewing history data.

More concretely, the program history data is represented by the number of points indicating the frequency, how many times programs in a serial program were recorded or reproduced after the first program in the serial program had been recorded {{program name, the number of points}, ... }. The category history data is represented by the number of points indicating the frequency, how many times programs of the same category were recorded or reproduced after the first program of the same category had been recorded {{category name, the number of points}, ... }.

In addition, the channel history data is represented by the number of points indicating the frequency, how many times programs provided on each channel by each broadcasting station were recorded, reproduced, and viewed {{1ch, the number of points}, ... {Nch, the number of points}}. The viewing time history data is represented by the number of points indicating the frequency, how many times programs were recorded for each time {{0 o'clock, the number of points}, ... {23 o'clock, the number of points}}.

Incidentally, when the viewer performs a display operation of the EPG screen, the CPU 11 retrieves a program that matches the viewer's preference from the EPG data S16 based on the above-mentioned record/reproduction/viewing history data, and displays the retrieved program on the display screen 8A of the monitor 8.

Figure 4:
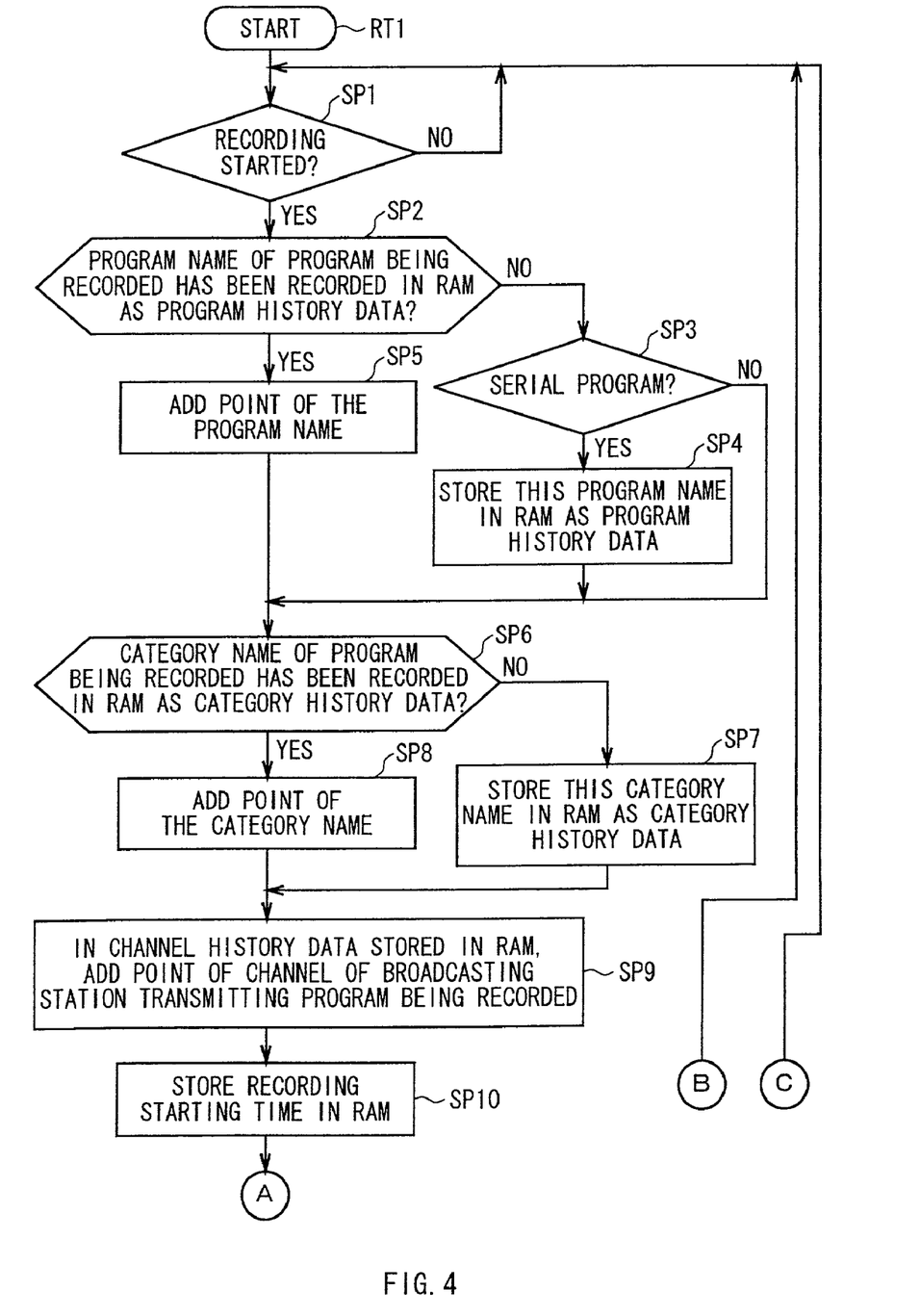
FIG. 4 is a flow chart showing a record/reproduction/viewing history creation processing procedure.
Figure 5:
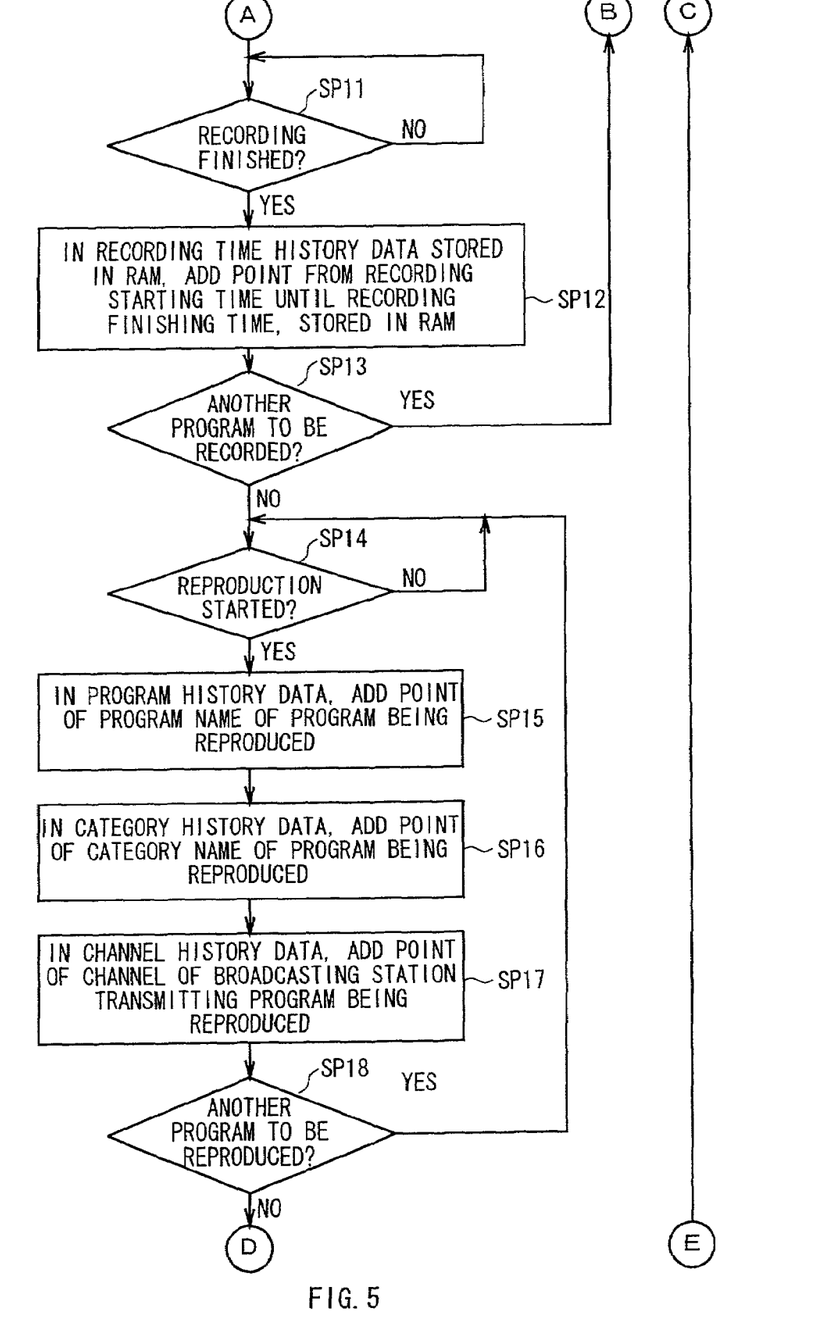
FIG. 5 is a flow chart showing a record/reproduction/viewing history creation processing procedure.

That is, in FIGS. 4 and 5, when entering a record/reproduction/viewing history creation processing procedure RT1, the CPU 11 of the IRD 5 moves to step SP1 to determine whether or not recording of the program designated by the viewer has been started, and repeats the processing step SP1 until a positive result is obtained.

When a positive result is obtained in step SP1, this represents that the viewer has performed an operation for recording a program and the designated program has been started, and then, the CPU 11 moves to the following step SP2 and determines whether or not the program name of the program currently being recorded is stored in the RAM 13 as program history data.

When a negative result is obtained in step SP2, this represents that a program with a program name identical to that of the program currently being recorded has not been recorded, and then, the CPU 11 moves to step SP3 and determines whether the program is a serial program or not. When a positive result is obtained in step SP3, this represents that it is possible that the viewer will view or record in future a program with a program name identical to that of the program currently being recorded, and then, the CPU 11 moves to step SP4 and stores the program name of the program in the RAM 13 as program history data.

On the other hand, when a negative result is obtained in step SP3, this represents that it is not possible that the viewer will view or record in future a program with a program name identical to that of the program currently being recorded, and then, the CPU 11 moves to step SP6.

To the contrary, when a positive result is obtained in step SP2, this represents that a program with a program name identical to that of the program currently being recorded has been recorded, and then, the CPU 11 moves to step SP5 to add a point corresponding to the program name of the program currently being recorded and renew the program history data.

Then, in the following step SP6, the CPU 11 determines whether or not the category name of the program currently being recorded is stored in the RAM 13 as the category history data. When a negative result is obtained in step SP6, this represents that a program with a category name identical to that of the program currently being recorded has not been recorded, and then, the CPU 11 moves to step SP7 to store the category name of the program in the RAM 13 as the category history data.

On the other hand, when a positive result is obtained in step SP6, this represents that a program with a category name identical to that of the program currently being recorded has been recorded, and then, the CPU 11 moves to step SP8 to add a point corresponding to the category name of the program currently being recorded and renew the category history data.

The CPU 11 moves to the following step SP9, and renews the channel history data by adding a point corresponding to the channel of the broadcasting station that transmits the program currently being recorded, in the channel history data recorded in the RAM 13. Then, in the following step SP10, the CPU 11 store the record starting time in the RAM 13. Then, the CPU 11, in the following step SP11, determines whether or not the recording of the program has been finished, and repeats the processing step SP11 until a positive result is obtained.

When a positive result is obtained in step SP11, this represents that the recording of the program has been finished, and then, the CPU 11 moves to step SP12, and renews the recording time history data by adding a point corresponding to a time ranging from a recording starting time until a recording finishing time, stored in the RAM 13, in the recording time history data recorded in the RAM 13.

Then, in step SP 13, the CPU 11 determines whether or not another program is to be recorded. When a positive result is obtained in step SP13, this represents that another program is to be recorded, and then, the CPU 11 returns to the above-mentioned step SP1 to start recording of another program in accordance with an operation of the viewer, and renews the record/reproduction history data recorded in the RAM 13 by repeating the same processing as the above-described steps SP2 through SP11.

On the other hand, when a negative result is obtained in step SP13, this represents that an operation for recording another program has not been performed, and then, the CPU 11 moves to step SP14 to determine whether to start reproduction of a program or not, and repeats the processing step SP14 until a positive result is obtained.

When a positive result is obtained in step SP14, this represents that an operation for reproducing a program has been performed by the viewer and the reproduction of the program has been started, and then, the CPU 11 moves to step SP15, and renews the program history data by adding a point corresponding to the program name of the program currently being reproduced, in the program history data stored in the RAM 13.

The CPU 11 moves to the following step SP16, and renews the category history data by adding a point corresponding to the category name of the program currently being reproduced, in the category history data stored in the RAM 13. Then, the CPU 11 moves to the following step SP17, and renews the channel history data by adding a point corresponding to the channel of the broadcasting station that transmitted the program currently being reproduced, in the channel history data stored in the RAM 13.

Then, in step SP 18, the CPU 11 determines whether to reproduce another program or not. When a positive result is obtained in step SP18, this represents that another program is to be reproduced, and then, the CPU 11 returns to the above-mentioned step SP14 to start reproducing another program, and renews the record/reproduction history data stored in the RAM 13 by repeating the same processing as the above-mentioned steps SP15 through SP17.

Figure 6:
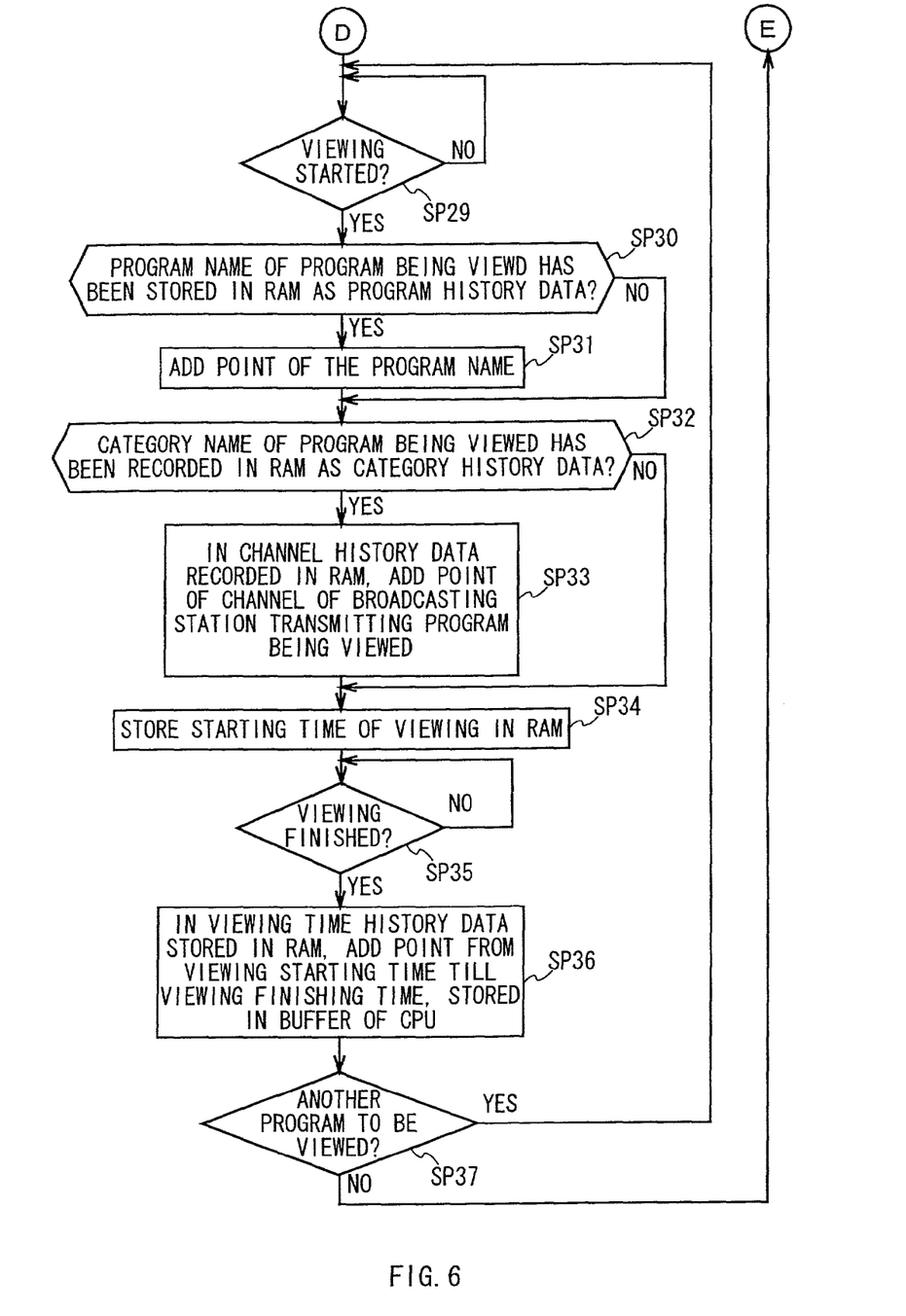
FIG. 6 is a flow chart showing a record/reproduction/viewing history creation processing procedure.

On the other hand, when a negative result is obtained in step SP18, this represents that another program is not to be reproduced, and then, the CPU 11 moves to step SP29 to determine whether or not the viewing of the program designated by the viewer has been started, and repeats the processing step SP29 until a positive result is obtained.

When a positive result is obtained in step SP29, this represents that the viewer has performed an operation for viewing a program and started viewing the designated program. Then, the CPU moves to the following step SP30 to determine whether the name of the currently viewed program has been stored as the program history data in the RAM 13.

When a negative result is obtained in step SP30, this represents that programs with the program name identical to that of the currently viewed program have not been recorded, then, the CPU 11 moves to step SP32.

On the contrary, when a positive result is obtained in step SO30, this represents that programs with the program name identical to that of the currently viewed program have been viewed. Then, the CPU 11 moves to step SP31 to update the program history data by adding a point corresponding to the program name of the currently viewed program.

Then, the CPU 11, in following step SP32, determines whether the category name of the currently viewed program has been stored as the category data in the RAM 13. When a negative result is obtained in step SP32, this represents that programs of the category name identical to that of the currently viewed program have not been recorded.

On the other hand, when a positive result is obtained in step SP32, this represents that programs of the category name identical to that of the currently viewed program have been recorded. At this time, the CPU 11 moves to step SP33 to renew the category history data by adding a point corresponding to the category name of the currently viewed program.

Then, the CPU 11 renews the channel history data by adding a point corresponding to the channel of the broadcasting station which is transmitting the currently viewed program, in the channel history data stored in the RAM 13. Then, in following step SP34, the viewing starting time is stored in the RAM 24. The CPU, in following step SP35, determines whether the record of the currently viewed program has been finished, and repeats the processing step SP35 until a positive result is obtained.

When a positive result is obtained in step SP35, this represents that the recording of the currently recorded program has been finished, and this time, the CPU 11 moves to step SP36 to renew the viewing time history data by adding a point corresponding a time ranging from the viewing starting time until the viewing finishing time, in the viewing time history data stored in the RAM 13.

Then, the CPU 11, in step SP37, determines whether to view another program or not. When a positive result is obtained in step SP37, this represents that another program is to be recorded, and this time, the CPU 11 returns to the aforementioned step SP29 to start recording of another program in accordance with the viewer's program, and repeats the same processing as step SP30 to step SP36 to renew the record/reproduction/viewing history data stored in the RAM 13.

As described above, the CPU 11 always stores the latest record/reproduction/viewing history data in the RAM 13 by executing the above-mentioned record/reproduction/viewing history creation processing procedure RT1. Further, when the viewer performs a display operation of a "recommended programs list" with the remote commander 7, the CPU 11 of the IRD 5 executes an EPG screen display processing procedure RT2 shown in FIG. 7.

Figure 7:
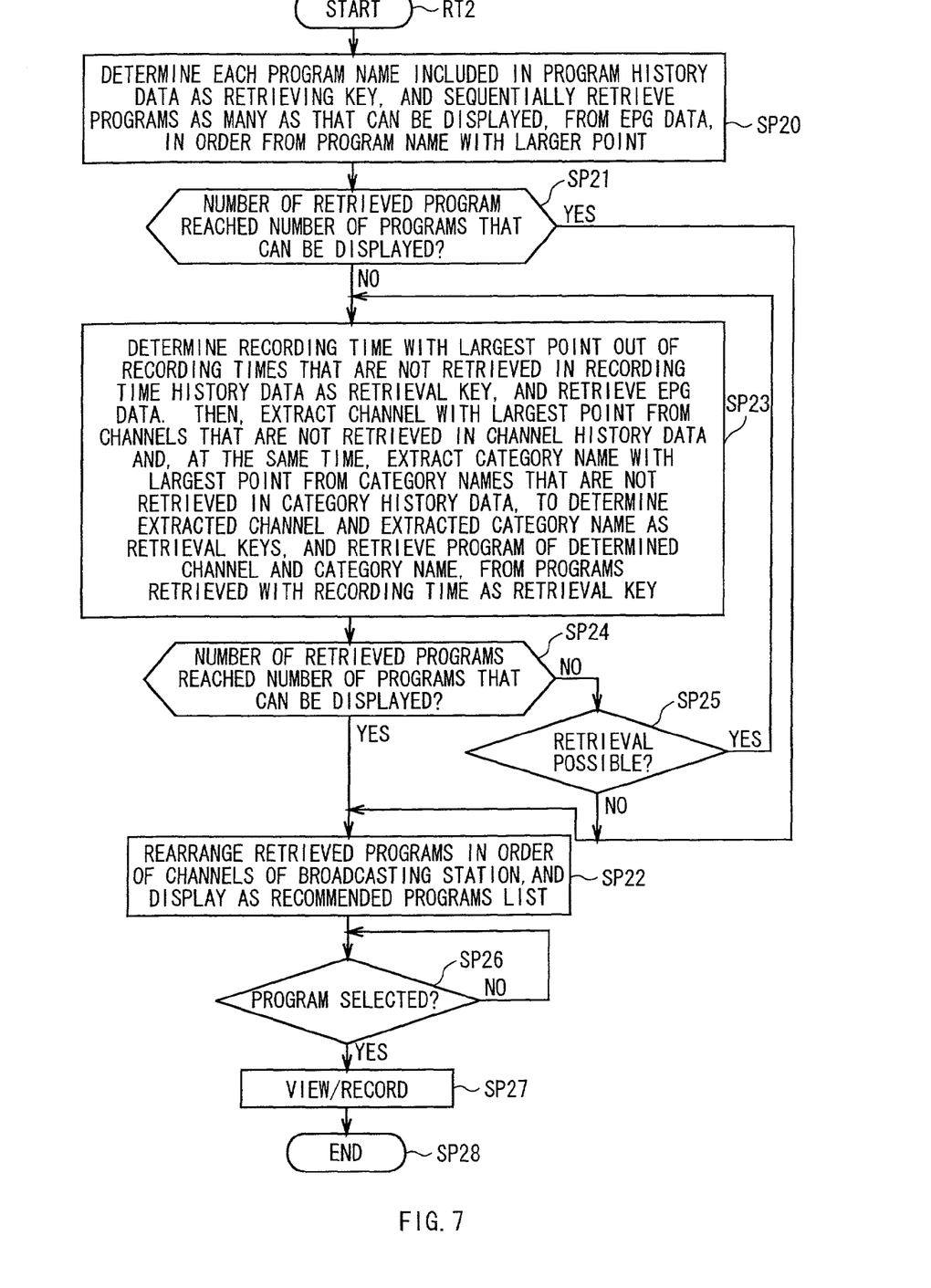
FIG. 7 is a flow chart showing an EPG screen display processing procedure.

That is, in FIG. 7, when entering the EPG screen display processing procedure RT2, the CPU 11 moves to step SP20 to operate as retrieving means, and determines each program name included in the program history data as a retrieval key for retrieving a program. Then, the CPU 11 sequentially retrieves programs with a program name that matches the retrieval key, from a plurality of programs included in the EPG data S16, as many as to be able to be displayed on the display screen 8A of the monitor 8, in order from a retrieval key with a larger point out of the retrieval keys.

Figure 8:
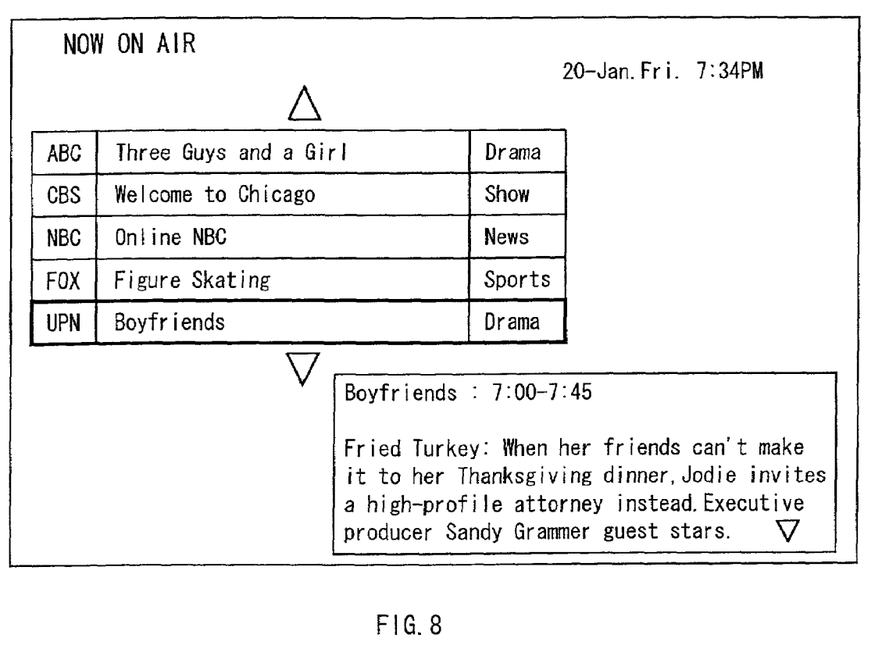
FIG. 8 is a schematic illustration showing an EPG screen.

Then, the CPU 11 moves to the following step SP21 to determine whether or not the number of retrieved programs has reached the number of programs that can be displayed at the same time on the display screen 8A of the monitor 8. When a positive result is obtained in step SP21, it represents that the number of retrieved programs has reached the number of programs that can be displayed on the display screen 8A of the monitor 8, and then, the CPU 11 moves to step SP22 to operate as display controlling means, rearranges the retrieved programs in the order of channels of the broadcasting stations, and displays the rearranged programs as, for example, a current "recommended programs list" as shown in FIG. 8 on the display screen 8A of the monitor 8.

On the other hand, when a negative result is obtained in step SP21, this represents that the number of retrieved programs has not reached the number of programs that can be displayed on the display screen 8A of the monitor 8, and then, the CPU 11 moves to step SP23, determines a recording time with a largest number of points from the recording time history data as a retrieval key, and retrieves a program to be broadcast in the recording time which is determined to be the retrieval key, from a plurality of programs included in the EPG data S16.

Then, the CPU 11 extracts a channel with the largest number of points from the channel history data and, at the same time, extracts a category name with the largest number of points from the category history data, to determine the extracted channel and the extracted category name as retrieval keys, and retrieves a program that is broadcasted by a broadcasting station of the determined channel and is categorized in the determined category name, from the programs retrieved with the recording time as a retrieval key.

The CPU 11 moves to the following step SP24 and determines whether or not the number of programs retrieved in steps SP20 and SP23 has reached the number of programs that can be displayed on the display screen 8A of the monitor 8. When a positive result is obtained in step SP24, this represents that the number of retrieved programs has reached the number of programs that can be displayed on the display screen 8A of the monitor 8, and then, the CPU 11 moves to step SP22, rearranges the retrieved programs in the order of channels of the broadcasting stations, and displays the rearranged programs as a "recommended program list" on the display screen 8A of the monitor 8.

On the other hand, when a negative result is obtained in step SP24, this represents that the number of retrieved programs has not reached the number of programs that can be displayed on the display screen 8A of the monitor 8, and then, the CPU 11 moves to step SP25, and determines whether or not it is possible to execute further program retrieval for the programs that have not been retrieved from the EPG data S16.

When a positive result is obtained in step SP25, this represents that it is possible to further execute program retrieval, and then, the CPU 11 moves to step SP23, determines a recording time with the largest number of points from the recording times that have not been retrieved, included in the recording time history data, as a retrieval key to execute retrieval, and further determines a channel and a category name with the largest number of points from the channels and category names that have not been retrieved, included in the channel retrieval history data and the category history data respectively, as retrieval keys to execute retrieval.

On the other hand, when a negative result is obtained in step SP25, this represents that it is impossible to continuously execute program retrieval, and then, the CPU 11 moves to step SP22, rearranges the retrieved programs in the order of channels of the broadcasting stations, and displays the rearranged programs as a "recommended program list" on the display screen 8A of the monitor 8.

In the following step SP26, the CPU 11 determines whether or not the viewer has performed a selection operation of a program from the "recommended programs list"

displayed on the display screen 8A of the monitor 8, and repeats the processing step SP26 until a positive result is obtained.

When a positive result is obtained in step SP26, this represents that the viewer has selected a desired program, and then, the CPU 11 moves to step SP27 and views or records the selected program. Then, the CPU 11 moves to step SP28 to finish the processing procedure.

(4) OPERATION AND EFFECT OF THE EMBODIMENT

In the above-mentioned configuration, the CPU 11 stores history concerning the record and reproduction which have been performed, in the RAM 13 as record/reproduction/viewing history data. Then, when the viewer performs a display operation of the EPG screen, the CPU 11 retrieves a program that matches the viewer's preference from an enormous number of programs included in the EPG data S16, based on the record/reproduction/viewing history data, and displays the retrieved programs on the display screen 8A of the monitor 8.

In this way, the CPU 11 can reduce operations required for retrieval because it is not necessary to input in advance a keyword for retrieving a program by storing record/reproduction/viewing history data representing the viewer's preference in the RAM 13, and retrieving a program that matches the viewer's preference, from an enormous number of programs based on the record/reproduction/viewing history data, in accordance with the display operation by the viewer, and at the same time, can avoid a program that does not match the viewer's preference from being retrieved, unlike the case in which a program is retrieved based only on a keyword.

In this connection, it can be generally determined that a program that has been recorded and recorded/reproduced has higher possibility of being preferred by a viewer than a program that has been simply viewed. Therefore, a history concerning record and reproduction of a program represents the viewer's preference more accurately than a history concerning viewing of programs.

With the above-mentioned configuration, by storing record/reproduction/viewing history data indicating the viewer's preference in the RAM 13 and retrieving a desired program from an enormous number of programs based on the record/reproduction/viewing history data, a viewer can easily retrieve a program that matches his preference, without inputting in advance a keyword for retrieving a program, hence time and effort in retrieving a program can be further reduced.

(5) OTHER EMBODIMENTS

Figure 9:
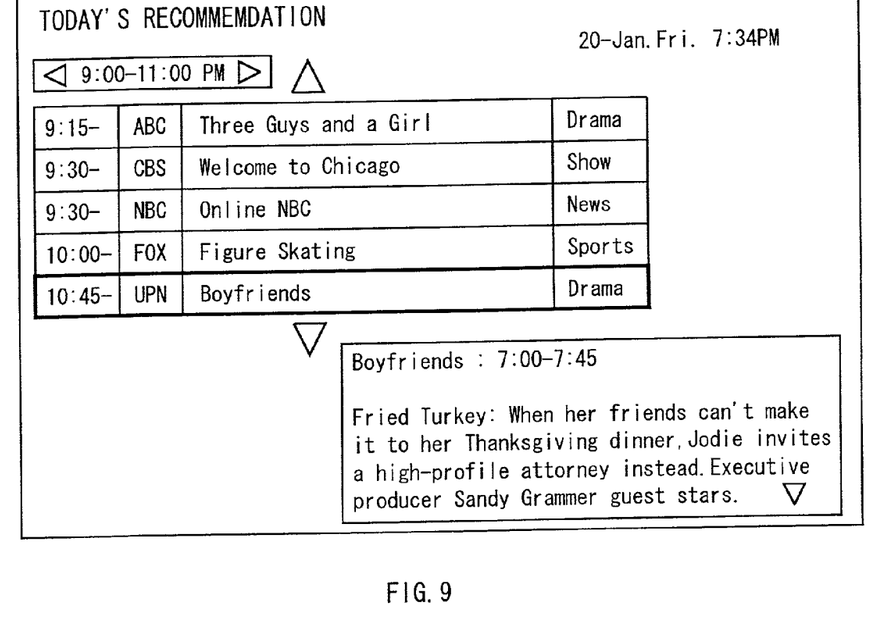
FIG. 9 is a schematic illustration showing an EPG screen of another embodiment.

Note that, although the above-mentioned embodiment has described the case in which a program that matches a viewer's preference is retrieved from currently broadcasted programs, and a result of the retrieval is displayed on the display screen 8A of the monitor 8 as a "recommended programs list" as shown in FIG. 8, the present invention is not limited to this embodiment, but may be made, for example, to retrieve a program that matches a view's preference from programs which will be broadcast and display a result of the retrieval on the display screen 8A of the monitor 8 as a "recommended programs list" as shown in FIG. 9. In this case, the viewer can set a recording reservation simply by selecting a desired program from the "recommended programs list" displayed on the display screen 8A and operating a recording reservation key (not shown), and time and effort required for a recording reservation can be further reduced because an operation for selecting a program as required conventionally is not necessary.

Figure 10:
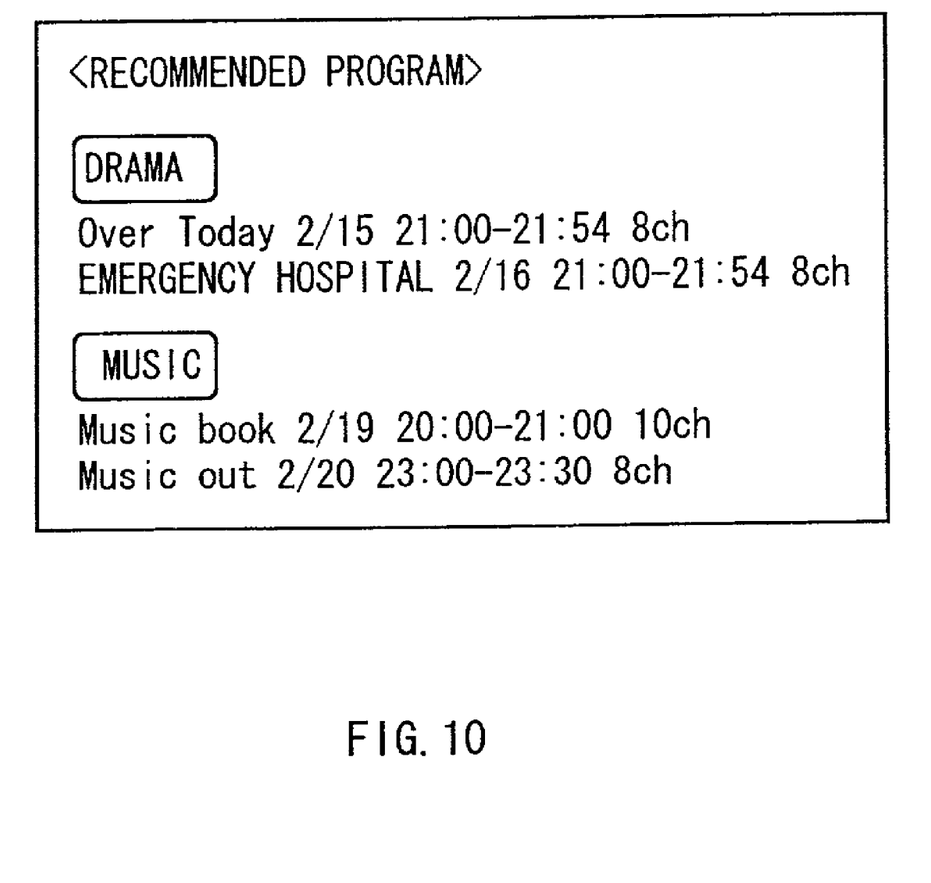
FIG. 10 is a schematic illustration showing an EPG screen of another embodiment.

In addition, although the above-mentioned embodiment has described the case in which a desired program is retrieved from an enormous number of programs based on record/reproduction/viewing history data comprising histories concerning recording and reproduction of programs, and displaying a result of the retrieval on the display screen 8A of the monitor 8, the present invention is not limited to this embodiment, but may be made, for example, to execute retrieval based on a history of recording reservations in the past and the record title list data S21 and display a result of the retrieval as a "recommended program list" as shown in FIG. 10 on the display screen 8A of the monitor 8. In this case, a viewer can set a recording reservation simply by selecting a desired program from the "recommended program list" displayed on the display screen 8A and operating a recording reservation key (not shown), and time and effort required for a recording reservation can be further reduced because an operation for selecting a program as required conventionally is not necessary.

Figure 11:
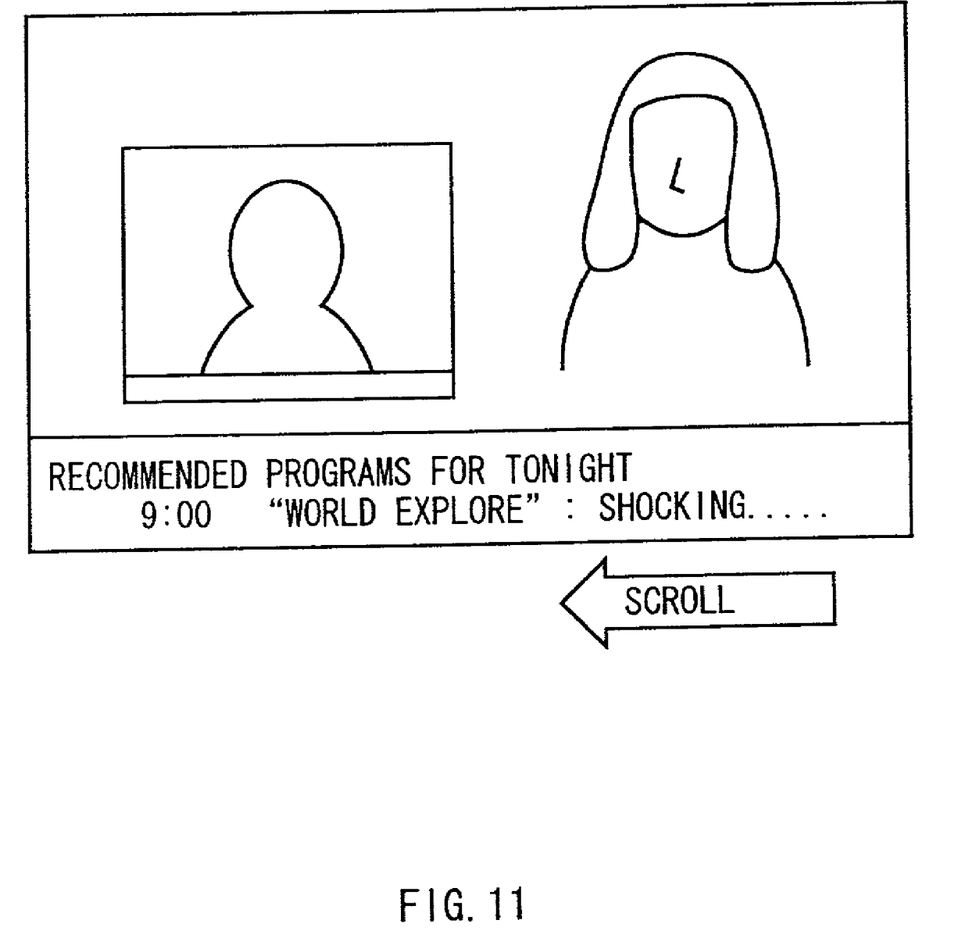
FIG. 11 is a schematic illustration showing an EPG screen of another embodiment.

In addition, although the above-mentioned embodiment has described the case in which a program that matches a viewer's preference is retrieved from an enormous number of programs included in the EPG data S16, and a list of the retrieved programs is displayed on the display screen 8A of the monitor 8, the present invention is not limited to this embodiment, but may be made, for example, to scroll-display character information concerning the retrieved programs on a part of the display screen 8A while displaying images of the program on the display screen 8A of the monitor 8 as shown in FIG. 11. In this case, the viewer can set a recording reservation by viewing the character information scroll-displayed while viewing a current broadcasted program of television broadcasting.

In addition, although the above-mentioned embodiment has described the case in which a list of program titles is displayed on the display screen 8A, the present invention is not limited to this embodiment, but can be widely applied to a case in which heading information indicating contents of predetermined information is displayed on the display screen 8A.

Moreover, although the above-mentioned embodiment has described the case in which information received in the IRD 5 of the analog ground wave broadcasting system 1 is displayed, the present invention is not limited to this embodiment, but may be widely applied to a case in which information sent by the digital satellite broadcasting, the wire broadcasting or the Internet is displayed.

INDUSTRIAL APPLICABILITY

A receiving apparatus can be used for the case of receiving broadcasting waves sent from a broadcasting station and displaying images based on the broadcasting waves on a monitor.

The invention claimed is:
1. An information retrieving method for retrieving content that is provided by a content provider, comprising:
   generating and updating an usage history of content based on a number of times content is recorded to a storage, or based on a number of times content is reproduced from the storage;

retrieving content on a basis of said usage history;
generating a list of retrieved content based on said usage history; and
processing the list of retrieved content on a basis of said usage history to generate a content guide that fits into a display screen for displaying the content guide at a same time, when the content guide based on the entire list of retrieved content cannot be displayed in the display screen at the same time.

2. The information retrieving method according to claim 1, wherein said processing further comprises:
rearranging the content guide in an order of channels of a broadcasting station.

3. The information retrieving method according to claim 1, wherein said processing further comprises:
adding content information to the content guide when more content information can be displayed in the content guide on the display screen at a same time.

4. The information retrieving method according to claim 1, wherein said generating and updating further comprises:
weighting a TV channel that broadcasts a content, a TV series that a content is part of, and a category of a content, based on a number of times the respective contents were recorded.

5. The information retrieving method according to claim 4, wherein said processing further comprises:
adding content information to the content guide based on the weight of a TV channel, when more content information can be displayed in the content guide on the display screen at a same time.

6. The information retrieving method according to claim 4, wherein said processing further comprises:
adding content information to the content guide based on the weight of a category of retrieved content, when more content can be displayed in the content guide on the display screen at a same time.

7. The information retrieving apparatus according to claim 1, wherein the usage history includes content history usage including recording or reproducing of content, category history regarding a category of a recorded or reproduced program, and channel history regarding a channel of a recorded or reproduced program.

8. An information retrieving apparatus configured to retrieve contents that is provided by a content provider, comprising:
an usage history generator configured to generate and update an usage history of the content that is provided by the content provider, based on recording of the content to a storage or based on reproducing recorded content from the storage;
a retrieving unit configured to retrieve content on a basis of said usage history;
a content guide generator configured to generate a list of the retrieved content; and
a content guide processor configured to process the list of retrieved content on a basis of said usage history to generate a content guide that fits into a display screen to display the content guide at a same time, when the content guide based on the entire list of retrieved content cannot be displayed in the display screen at the same time.

9. The information retrieving apparatus according to claim 8, wherein said content guide processor is further configured
to rearrange the content guide in an order of channels of a broadcasting station.

10. The information retrieving apparatus to claim 8, wherein said content guide processor is further configured
to add content information to the content guide when more retrieved content can be displayed in the content guide on the display screen at a same time.

11. The information retrieving apparatus according to claim 8, wherein said usage history generator is further configured to
weight a TV channel that broadcasts a content, a TV series that a content is part of, and a category of a content, based on a number of times the respective content were recorded to the storage or reproduced from the storage.

12. The information retrieving apparatus according to claim 11, wherein said content guide generator is further configured to
add content information to the content guide based on the weight of a TV channel, when more retrieved content information can be displayed in the content guide on the display screen at a same time.

13. The information retrieving apparatus according to claim 11, wherein said content guide processor is further comprises to
add content information to the content guide based on the weight of a category of content, when more retrieved content information can be displayed in the content guide on the display screen at a same time.

14. The information retrieving apparatus according to claim 8, wherein the usage history includes information on content history usage including recording or reproducing of content, category history regarding a category of a recorded or reproduced program, and channel history regarding a channel of a recorded or reproduced program.

* * * * *